United States Patent
Emery et al.

[11] 3,907,391
[45] Sept. 23, 1975

[54] FLEXIBLE INTERCELL CONNECTOR FOR ELECTROLYTIC CELLS

[75] Inventors: Alvin T. Emery, Youngstown; Lee G. Evans, Tonawanda; John E. Currey, Lewiston, all of N.Y.

[73] Assignee: Hooker Chemicals and Plastics Corporation, Niagara Falls, N.Y.

[22] Filed: Aug. 1, 1973

[21] Appl. No.: 384,646

[52] U.S. Cl. ............ 339/29 R; 238/14.1; 339/263 L
[51] Int. Cl.² ..................... H01R 7/08; H01R 11/00
[58] Field of Search ............ 339/28, 47, 29, 48, 22, 339/49, 263, 198, 143; 238/14–14.15

[56] References Cited
UNITED STATES PATENTS

| | | | |
|---|---|---|---|
| 1,002,348 | 9/1911 | Wherry | 238/14.1 |
| 1,097,602 | 5/1914 | Bliss | 339/29 R |
| 1,163,703 | 12/1915 | Taylor | 339/263 L |
| 1,675,750 | 7/1928 | Dahlstrom et al. | 238/14.1 X |
| 1,757,822 | 5/1930 | Woofter | 339/263 L |
| 3,231,851 | 1/1966 | Abel et al. | 339/29 R |

FOREIGN PATENTS OR APPLICATIONS

| | | | |
|---|---|---|---|
| 523,076 | 7/1940 | United Kingdom | 339/29 R |

*Primary Examiner*—Roy D. Frazier
*Assistant Examiner*—Terrell P. Lewis
*Attorney, Agent, or Firm*—Peter F. Casella

[57] ABSTRACT

The present invention provides a flexible intercell connector, suitable for connecting electrolytic cells, comprising a plurality of thin conductive metal sheets having a portion of their major surfaces in a spaced relationship to one another. The conductive metal sheets are preferably joined and laminated at their opposite ends by encapsulation and fusion in a casting of conductive metal around each end. The conductive metal castings encapsulating each of the ends of the conductive metal sheets are cast in such a manner to serve as attachment means.

12 Claims, 4 Drawing Figures

FLEXIBLE INTERCELL CONNECTOR FOR ELECTROLYTIC CELLS

BACKGROUND OF THE INVENTION

This invention relates to flexible intercell connectors for electrolytic cells. More particularly, this invention relates to flexible intercell connectors used to convey electric current from one electrolytic cell to another electrolytic cell. The flexible intercell connectors of the present invention possess improved electrical and mechanical properties over flexible intercell connectors of the prior art.

Electrolytic cells, for example, chlor-alkali diaphragm cells, are operated in commercial production facilities in large groups of individual cells. The individual cells are electrically connected to each other in groups of about 50 to 100 or more cells. The cells are connected in electrical series to each other and one or more intercell connectors are used to connect the anode of one cell to the cathode of the adjoining cell. Electric current is supplied to the cells from a common source and is passed from cell to cell through the intercell connectors and thus through the entire group. This method of connecting electrolytic cells is highly advantageous, however, difficulties are encountered resulting from thermal expansion and/or contraction in the cells and between the cells when the cells are in operation. In chlor-alkali diaphragm cells, the normal operating temperature of the electrolyte in each cell ranges from about 90° to about 105°C and certain of the metal parts, particularly the intercell connectors, may be heated to substantially higher temperatures. Thus, depending upon the size of the particular electrolytic cell, the thermal expansion can range from about 1/32 to about ½ inch or more per cell. This thermal expansion creates forces which can cause misalignment and eventual shorting of the electrodes in the cells. This thermal expansion can also have a cumulative effect throughout the entire group of cells. In the early prior art, intercell connectors were made of a heavy conductive metal, for example, copper. The intercell connectors were about 1 inch thick and about 4 to 8 inches wide. One to ten and usually four to six of these intercell connectors were used for each electrolytic cell. Several thousand pounds or more of force were required to flex each intercell connector. Thus, a substantially rigid intercell connection resulted, and there was no flexibility allowance for the forces created by thermal expansion. The extreme forces created by thermal expansion in the cells and between the cells caused misalignment and eventual shorting of the electrodes in the cells. This misalignment and eventual shorting significantly reduced the current efficiency of the cells and this reduction in current efficiency could not be tolerated in the economical operation of higher capacity electrolytic cells.

Flexible intercell connectors have been developed for electrolytic cells and are disclosed in U.S. Pat. No. 3,565,783 by Emery et al., issued Feb. 23, 1971, to Hooker Chemical Corporation. These flexible intercell connectors comprise a plurality of conductive metal sheets having their major surfaces in a spaced relationship to one another. The conductive metal sheets are joined at their opposite ends by conventional welding techniques to provide attachment means or the ends of the conductive metal sheets are joined to separate attachment means by conventional welding techniques. Other flexible intercell connectors for electrolytic cells are disclosed in British Pat. No. 1,310,734 and U.S. Pat. No. 3,432,422.

The flexible intercell connectors of the prior art were an improvement over the earlier solid metal intercell connectors from a standpoint of flexibility but better electrical and mechanical properties were required.

The major problems associated with the flexible intercell connectors of the prior art were weaknesses in the intercell connectors in areas where they were welded by conventional welding techniques. There have always been problems associated with the welding of a plurality of thin conductive metal sheets. These designs were vulnerable to mechanical breakage at the welds due to repeated mechanical flexing and heat cycling. This mechanical breaking at the welds also resulted in a loss of electrical properties. In addition, it was undesirable to use intercell connectors having welds across the path of electric current flow because of the difficulties involved by the welder in obtaining welds having good electrical properties. The skill of the welder also had to be relied upon to produce welds having good mechanical properties which would also retain their electrical properties.

The present invention provides a flexible intercell connector comprising a plurality of thin conductive metal sheets having a portion of their major surfaces in a spaced relationship to one another. The conductive metal sheets are preferably joined and laminated at their opposite ends by encapsulation and fusion in a casting of conductive metal around each end. The conductive metal casings encapsulating each of the ends of the conductive metal sheets are cast in such a manner to serve as attachment means. The cast intercell connector of the present invention is very superior to the welded intercell connectors of the prior art in both electrical and mechanical properties. The electrical properties are superior because there are no welds across the path of electric current flow and the skill of the welder does not have to be relied upon to obtain mechanical welds that will retain their electrical properties. The metal castings which serve as attachment means offer superior electrical properties because they are cast around the conductive metal sheets and have contact surfaces that can be easily cleaned repeatedly to provide good electrical contact and reduce operating temperatures. This reduces power costs and extends the life of other heat degradable parts of the cells. The mechanical properties are superior because the ends of the conductive metal sheets are encapsulated by the conductive metal castings and are held by both a metallurgical bond and a physical bond. There are no conventional weld areas that are directly flexed or stressed and therefore there is little chance of mechanical failure. Since there are no conventional weld areas, there are also no weld flaws such as impurities, microcracks or pores to cause mechanical failure. The use of filler metals and fluxes as used in conventional welds is also eliminated. The tensile strength of the cast intercell connector is superior because of the nature of the metallurgical bond and the physical bond obtained by casting using a proper mold design. The mold design can be varied, depending upon the number, thickness and width of the conductive metal sheets, to obtain maximum tensile strength.

The flexible intercell connector of the present invention is useful as an electrical connector between many different types of electrolytic cells such as chlor-alkali cells, chlorate cells, hydrochloric acid cells, fused salt cells or the like, however, the most preferred use is with chlor-alkali cells. Therefore, the invention will be further described with particular reference to chlor-alkali cells and particularly to chlor-alkali diaphragm cells. However, such a description is not to be considered as limiting the particular use of the flexible intercell connector of the present invention.

SUMMARY OF THE INVENTION

In accordance with the present invention, there is provided a flexible intercell connector comprising a plurality of thin conductive metal sheets having a portion of their major surfaces in a spaced relationship to one another. The conductive metal sheets are preferably joined and laminated at their opposite ends by encapsulation and fusion in a casting of conductive metal around each end. The conductive metal castings encapsulating each of the ends of the conductive metal sheets are cast in such a manner to serve as attachment means.

In another embodiment of the present invention, the conductive metal sheets are joined and laminated at their opposite ends by encapsulation in a casting of conductive metal around each end with substantially no fusion of the conductive metal sheets.

DESCRIPTION OF THE DRAWINGS

The present invention is further described by reference to the drawings in which:

Referring now to FIG. 1, flexible intercell connector 11 is positioned between electrolytic cells 12 and 13. Attachment means 14 of flexible intercell connector 11 is connected to anode busbar 15 of electrolytic cell 12 by means of one or more bolt and nut 16 or any other suitable connecting means such as clamping, welding or the like. Attachment means 17 of flexible intercell connector 11 is connected to cathode bar 18 of electrolytic cell 13 by means of one or more bolt and nut 19 or any other suitable connecting means such as clamping, welding or the like. Electrolytic cells 12 and 13 are thus connected to each other by flexible intercell connector 11.

Referring now to FIG. 2, flexible intercell connector 11 is comprised of a plurality of conductive metal sheets 21. Major surfaces 22 of conductive metal sheets 21 are positioned in a spaced relationship to one another and are separated by spaces 23. Conductive metal sheets 21 are joined and laminated at opposite ends 24 and 25 by encapsulation in conductive metal castings 26 and 27 around ends 24 and 25. Conductive metal castings 26 and 27 at ends 24 and 25 of conductive metal sheets 21 are cast in such a manner to serve as attachment means 14 and 17 and can be conveniently cast with holes 28 and 29 to conserve valuable conductive metal. Ends 24 and 25 of conductive metal sheets 21 are encapsulated within conductive metal castings 26 and 27 and are held by both a metallurgical bond, that is, fusion or partial fusion bonding of ends 24 and 25 with conductive metal castings 26 and 27 and a physical bond, that is, compression bonding of ends 24 and 25 with conductive metal castings 26 and 27 upon cooling and shrinkage of the castings. The extent of fusion of the conductive metal sheets is about 40 to about 100 percent, preferably at least about 70 percent, and most preferably at least about 85 percent.

Figure 1:
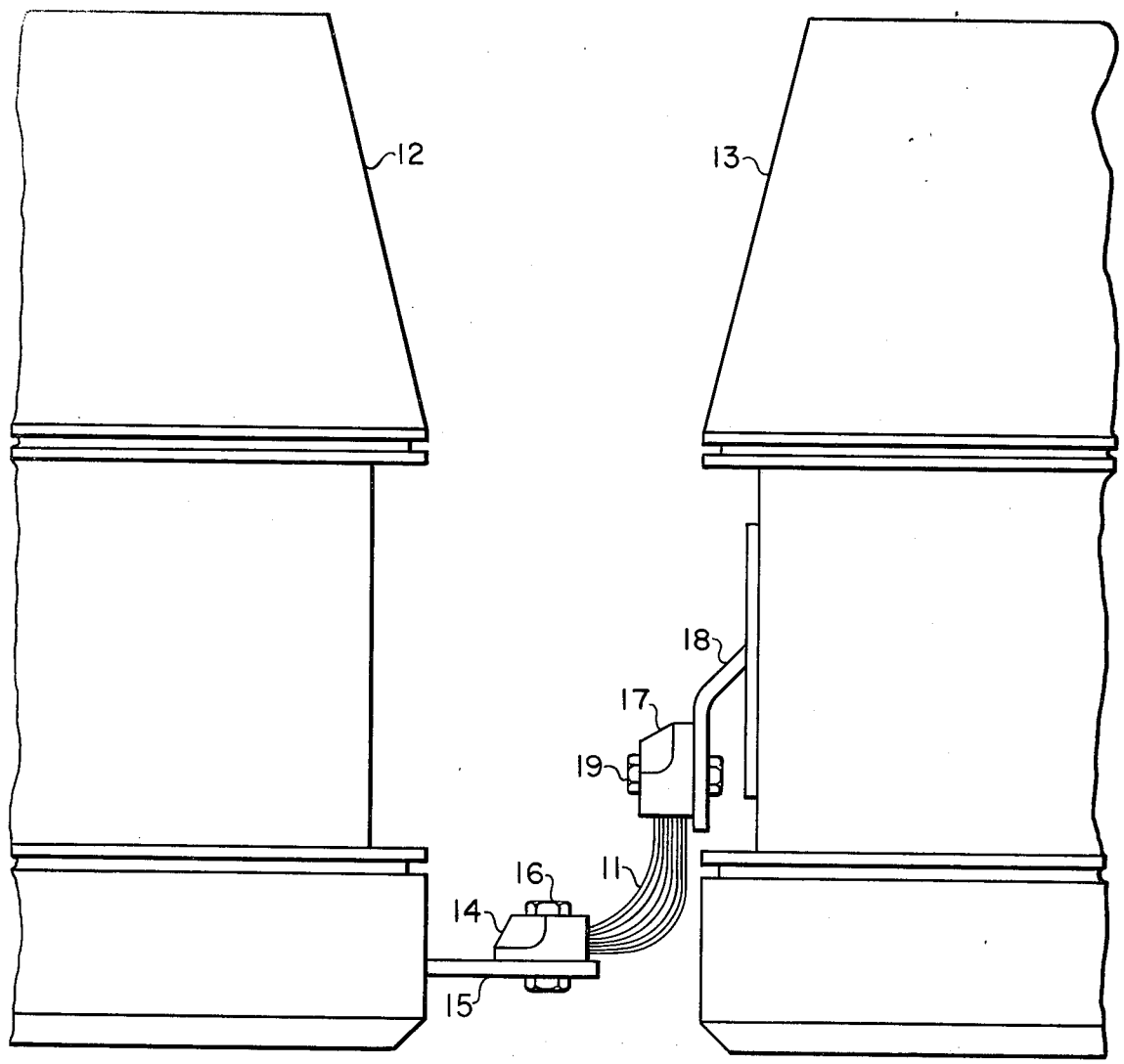
FIG. 1 is a side view of two partially illustrated electrolytic cells and shows the flexible intercell connector of the present invention typically positioned between the two cells.

In another embodiment of the present invention, conductive metal sheets 21 are joined and laminated at opposite ends 24 and 25 by encapsulation in conductive metal castings 26 and 27 and are held by substantially a physical bond with substantially no fusion of the conductive metal sheets. Flexible intercell connector 11 is preferably L-shaped, that is, positioned at about 90° to provide a suitable flexible connection between electrolytic cells. Flexible intercell connector 11 can also be U-shaped, that is, positioned at about 0° to provide a suitable flexible connection between electrolytic cells. Flexible intercell connector 11 can be positioned at other angles including a plurality of angles to form a corrugated structure and can be utilized with correspondingly good results at these other angles. Flexible intercell connector 11 possesses sufficient flexibility that it can be flexed either horizontally or vertically from either side of its positioned angle through a flex angle or arc of about 10°, 30° or even 40° or more.

Conductive metal sheets 21 can be of various thicknesses, lengths and widths according to the particular demands of the particular electrolytic cell. In general, upon the particular electrical current requirements, flexibility requirements, design requirements and the like, conductive metal sheets 21, for instance, can have a thickness of about 10 to about 250 mils, preferably about 30 to about 125 mils. Thus, for flexible intercell connector a total thickness of about 2.5 cm at ends 24 and 25, the number of conductive metal sheets 21 can vary from about 4 to about 100. Preferably, the number of conductive metal sheets 21 can be about 8 to about 35. The total thickness of flexible intercell connector at ends 24 and 25, for instance, can be about one to about 4 cm or more, preferably about 2 to about 3 cm. The length of conductive metal sheets 21, for instance, can be about 15 cm to about 80 cm or more, preferably about 20 cm to about 65 cm. The width of conductive metal sheets 21, for instance, can be about 7 to about 25 cm or more, preferably about 8 to about 16 cm. The thickness, length, and width and general configuration of conductive metal castings 26 and 27 should be sufficient to encapsulate ends 24 and 25 of conductive metal sheets 21 and form a metallurgical bond and/or a physical bond at each of ends 24 and 25 and also to enable conductive metal castings 26 and 27 to be used as suitable attachment means.

Major surfaces 22 of conductive metal sheets 21 are positioned in a spaced relationship to one another and are separated by spaces 23. The spaced distance designated by spaces 23 between adjoining conductive metal sheets 21 is that distance necessary to preferably avoid completely contacting major surfaces 22 of adjoining conductive metal sheets 21 when flexing intercell connector 11 through the anticipated flex angle or arc. Spaces 23 do not have to be of equal distances and the spaced distances can vary depending upon the proximity of adjoining conductive metal sheets 21 to ends 24 and 25 and the degree of flexing. In general, depending upon the particular electrical current requirements, flexibility requirements design requirements and the like, the maximum spaced distance, for instance, can be as small as about 10 mils or less or as large as about 250 mils, but usually the maximum spaced distance will be about 20 to about 125 mils.

Flexible intercell connector 11 is preferably fabricated from a highly conductive metal such as copper, silver and the like or alloys thereof, but it can also be fabricated from a less conductive metal such as aluminum, steel, nickel and the like or alloys thereof. Conductive metal sheets 21 are preferably of the same metal with ends 24 and 25 cast in that same metal, however, said sheets can be of dissimilar metals with said ends cast in dissimilar metals. Because of the desirability of obtaining a flexible intercell connector having a low electrical resistance and a reasonable cost, copper is usually the most preferred metal.

Figure 3:
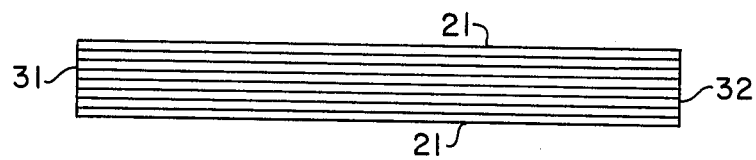
FIGS. 3 and 4 show the steps of a typical method of fabricating the flexible intercell connector of the present invention.
Figure 4:
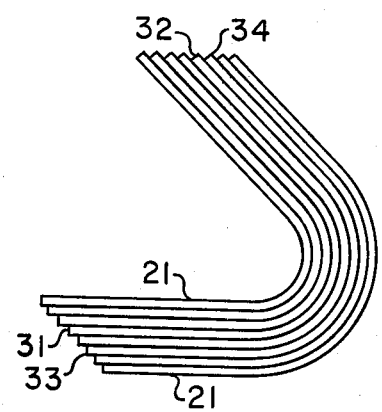

Referring now to FIGS. 3 and 4, the plurality of conductive metal sheets 21 can be of equal lengths and can be positioned on top of each other as shown in FIG. 3. Conductive metal sheets 21 can then be overbent to a predetermined angle as shown in FIG. 4. In the process of overbending, steps 33 and 34 are formed at ends 31 and 32 or at one end only due to the geometry of overbending conductive metal sheets 21 which are of equal lengths. Conductive metal can then be cast around ends 31 and 32 to provide attachment means 14 and 17 as shown in FIG. 1. A flexible intercell connector such as that shown in FIG. 1 can be produced by backbending conductive metal sheets 21 to a desired position angle thereby producing spaces 23 between surfaces 22 of adjoining conductive metal sheets 21 which impart flexibility to the intercell connector.

The method shown in FIGS. 3 and 4 is particularly desirable because the plurality of conductive metal sheets 21 do not have to be cut in different lengths and no complicated fabricating techniques have to be used to produce spaces 23 between the adjoining conductive metal sheets. It is also believed that a better metallurgical bond is achieved because of the stepped configuration at the ends of the conductive metal sheets.

The method shown in FIGS. 3 and 4 should not be considered to be limiting since there are other suitable methods for fabricating the flexible intercell connector of the present invention.

PREFERRED EMBODIMENTS

The following examples illustrate the practice and principles of the present invention and a mode of carrying out the present invention.

EXAMPLE 1

Figure 2:
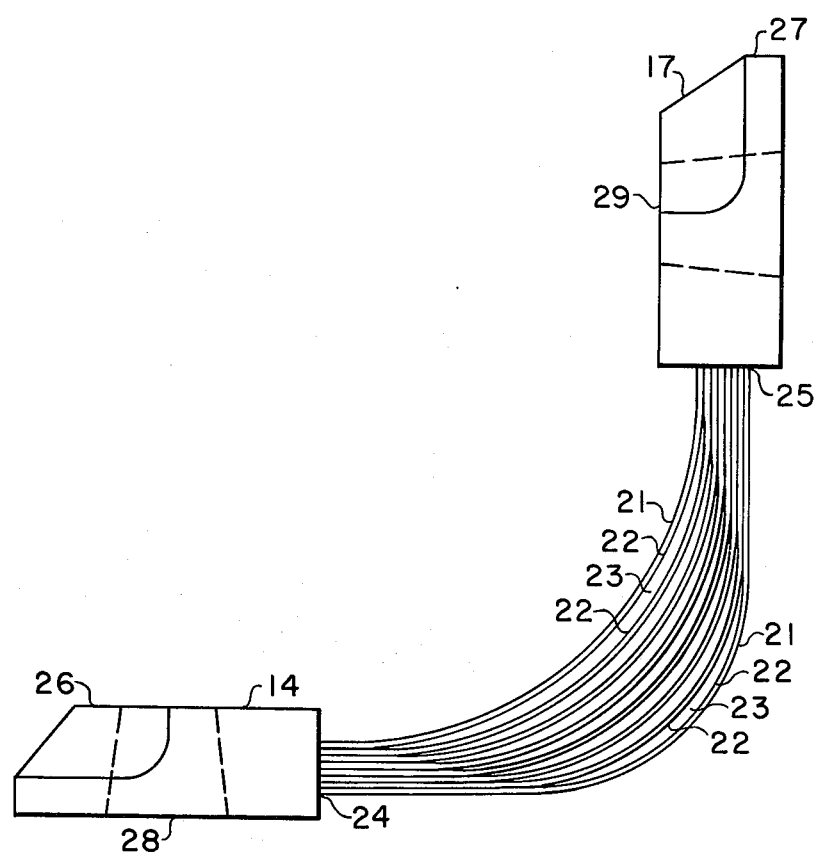
FIG. 2 is a side view of a typical intercell connector of the present invention.

Twenty rectangular sheets of electrolytic tough pitch copper having a thickness of 50 mils each were positioned on top of each other and were overbent to an acute angle of 70° as shown in FIG. 4. Copper having a purity of 99.9 percent was melted and heated to a temperature of 1370°C and was cast around the ends of the copper sheets. The temperature of the molten copper was maintained between 1315° and 1370°C during the pouring of the casting. The castings were made in sand molds. After the castings had cooled, the copper sheets were backbent to an angle of 90° as shown in FIG. 2, thereby producing spaces between the surfaces of the adjoining copper sheets and imparting excellent flexibility to the intercell connector. Holes were cast in the copper castings to provide attachment means.

Six flexible intercell connectors were fabricated in accordance with the above procedure, in which each copper sheet had a length of 37 cm and a width of 14 cm. These were designated as the long intercell connectors.

Eighteen flexible intercell connectors were fabricated in accordance with the above procedure with the exception that only 13 rectangular sheets of copper having a thickness of 80 mils each were used and each copper sheet had a length of 23 cm and a width of 14 cm. These were designated as the short intercell connectors.

EXAMPLE 2

The flexible intercell connectors fabricated in Example 1 were used to electrically interconnect chlor-alkali diaphragm cells in the manner shown in FIG. 1 and were evaluated along with a representative number of welded flexible intercell connectors of the prior art. The flexible intercell connectors of the present invention had superior flexibility to the welded intercell connectors of the prior art. The welded intercell connectors were fabricated from electrolytic tough pitch copper and had essentially the same dimensions and copper content as the long intercell connectors fabricated in Example 1.

Table I contains electrical and temperature data showing the superiority of the flexible intercell connectors of the present invention. The data in Table I summarize average values at about 0.26 ka./sq. cm. current density.

TABLE I

|  | Welded Connectors | Example 1 Present Invention | |
|---|---|---|---|
|  |  | Long Connectors | Short Connectors |
| Temperature of Intercell Connector, °C | 142.3 | 102.6 | 110.2 |
| Voltage Drop Across One Attachment Means and Electrolytic Cell, mv. | 30.3 | 4.3 | 4.0 |
| Voltage Drop Across Inter-Cell Connector, mv. | 39.4 | 27.7 | 16.9 |
| Voltage Drop Across Adjoining Electrolytic Cells Between Opposite Attachment Means, mv. | 100.0 | 36.3 | 24.8 |

As can be seen from the above data contained in Table I, the flexible intercell connectors of the present invention are superior in every respect to the welded intercell connectors of the prior art. They have a significantly lower voltage drop across opposite attachment means and they operate at a significantly lower temperature thereby reducing power costs and extending the life of other heat degradable parts of the cells. Flexible intercell connectors of the present invention can be fabricated using less conductive metal as evidenced by the data in Table I on the short connectors and still have significantly superior electrical and thermal properties without any sacrifice in flexibility. This results in a considerable savings in conductive metal costs.

The flexible intercell connectors of the present invention have significantly superior mechanical properties and showed no evidence of mechanical failure after about one year in experimental service. In the welded intercell connectors of the prior art, weld cracks were sometimes observed at the time of installation and usually new weld cracks developed after a few months in service which resulted in higher voltage drops and operating temperatures.

While various embodiments of the present invention have been described, the embodiments described are not intended to be understood as limiting the scope of the present invention. It is to be realized that changes therein are possible. It is further intended that each element recited in any of the following claims is to be understood as referring to all equivalent elements for accomplishing substantially the same results in substantially the same or equivalent manner. The following claims are intended to cover the present invention broadly in whatever form the principles thereof may be utilized.

What is claimed is:

1. A flexible intercell connector, suitable for electrically connecting electrolytic cells, comprising a plurality of thin conductive metal sheets of a predetermined length joined and laminated at their opposite ends by encapsulation and fusion to form a conductive metal casting around each end, said metal sheets comprising a stack between said castings, and having a portion of their major surfaces in a spaced relationship to one another, each sheet in said stack being progressively greater in length.

2. The flexible intercell connector of claim 1 wherein said conductive metal sheets number about 4 to about 100 and are about 10 to about 250 mils in thickness.

3. The flexible intercell connector of claim 2 wherein said conductive metal sheets number about 8 to about 35 and are about 30 to about 125 mils in thickness.

4. The flexible intercell connector of claim 1 wherein said conductive metal sheets are spaced at a maximum distance of about 10 to about 250 mils between major surfaces.

5. The flexible intercell connector of claim 4 wherein said conductive metal sheets are spaced at a maximum distance of about 20 to about 125 mils between major surfaces.

6. The flexible intercell connector of claim 1 wherein the extent of fusion of the said conductive metal sheets is about 40 to about 100 percent.

7. The flexible intercell connector of claim 1 wherein said intercell connector is L-shaped.

8. The flexible intercell connector of claim 1 wherein said intercell connector is fabricated from copper.

9. A process for fabricating a flexible intercell connector, suitable for connecting electrolytic cells, which comprises the steps of:

A. positioning a plurality of thin conductive metal sheets on top of each other;
   B. overbending said conductive metal sheets to a predetermined angle;
   C. joining and laminating the opposite ends of said conductive metal sheets while at said predetermined angle by casting conductive metals around each end of said conductive metal sheets thereby encapsulating and fusing each end of said conductive metal sheets in cast conductive metal and forming a cast conductive metal attachment means at each end of said conductive metal sheets,
   D. thereafter backbending said conductive metal sheets to a desired position angle thereby producing spaces between said conductive metal sheets and imparting flexibility to the intercell connector.

10. The process of claim 9 wherein said conductive metal sheets are of the same length and form a stepped configuration at each of their opposite ends when overbent, said conductive metal being cast around said stepped configurations.

11. The process of claim 9 wherein said conductive metal sheets are overbent to an acute angle and are backbent to about 90° or an L-shape.

12. The process of claim 9 wherein said flexible intercell connector is fabricated from copper.

* * * * *